Feb. 19, 1935. J. T. LISTER 1,991,686
POWER DRIVE FOR CYCLICAL RECORD MACHINES
Filed Feb. 6, 1932 3 Sheets-Sheet 1
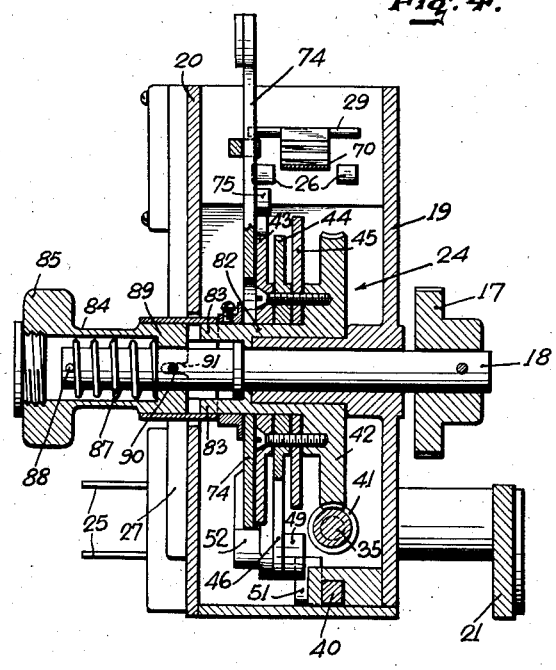
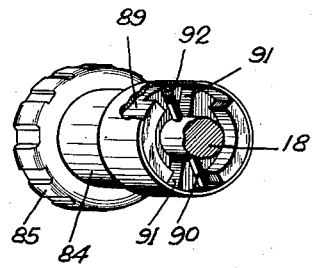
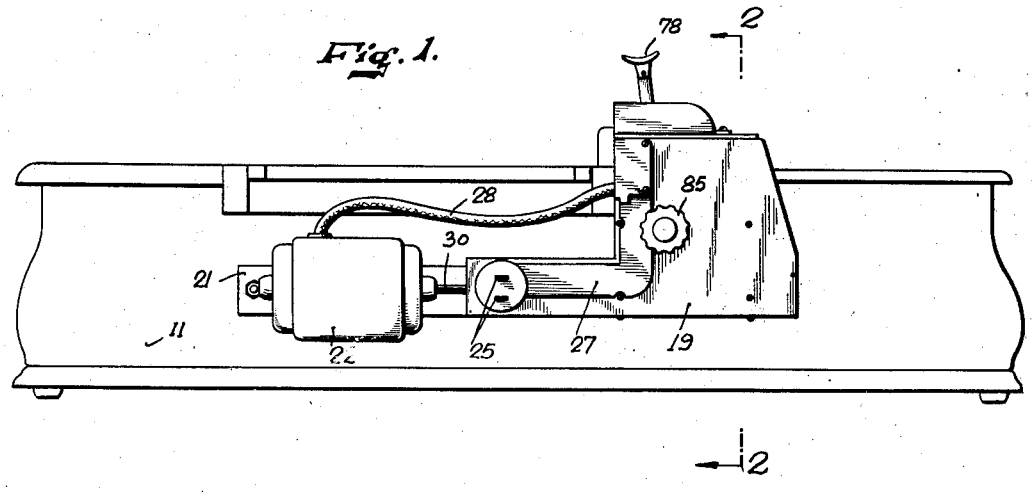
INVENTOR.
JAMES T. LISTER,
BY Duell, Dunn & Anderson.
ATTORNEYS.

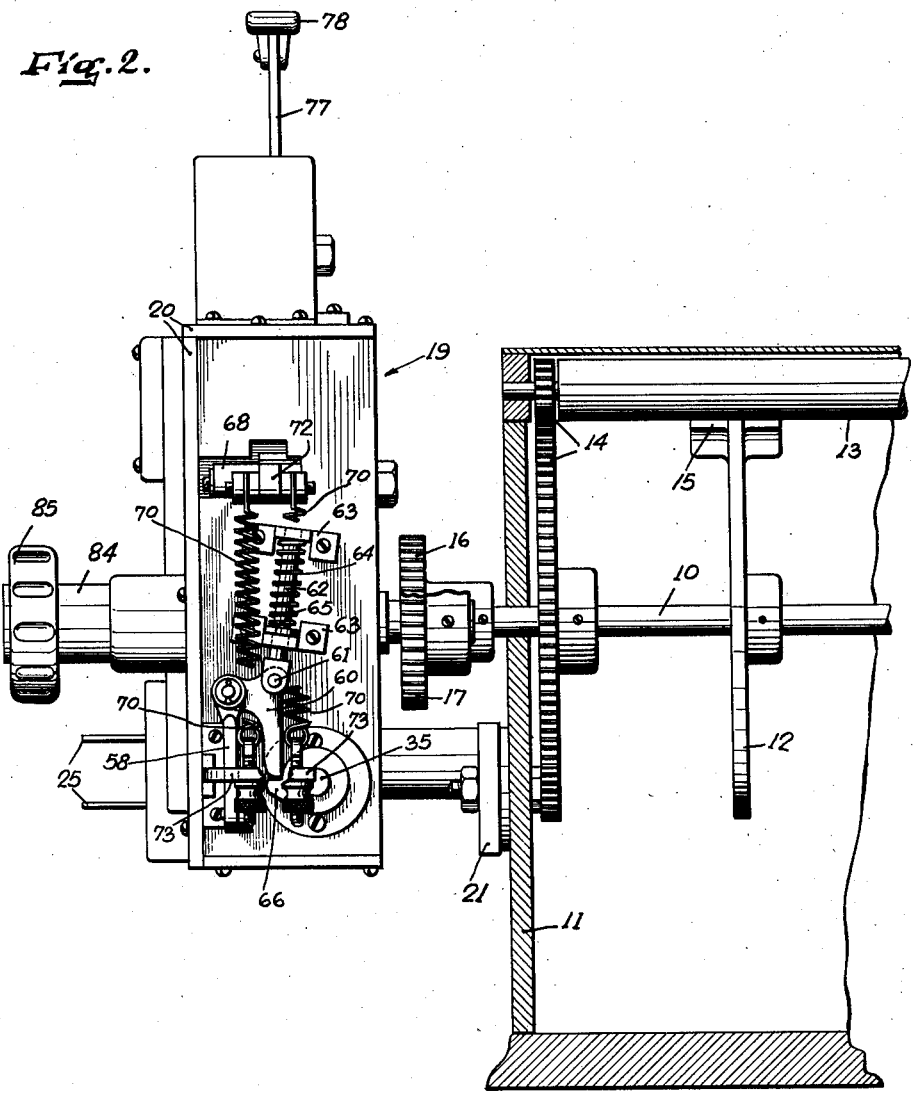

Feb. 19, 1935. J. T. LISTER 1,991,686
POWER DRIVE FOR CYCLICAL RECORD MACHINES
Filed Feb. 6, 1932 3 Sheets-Sheet 3
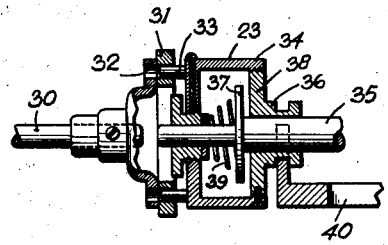
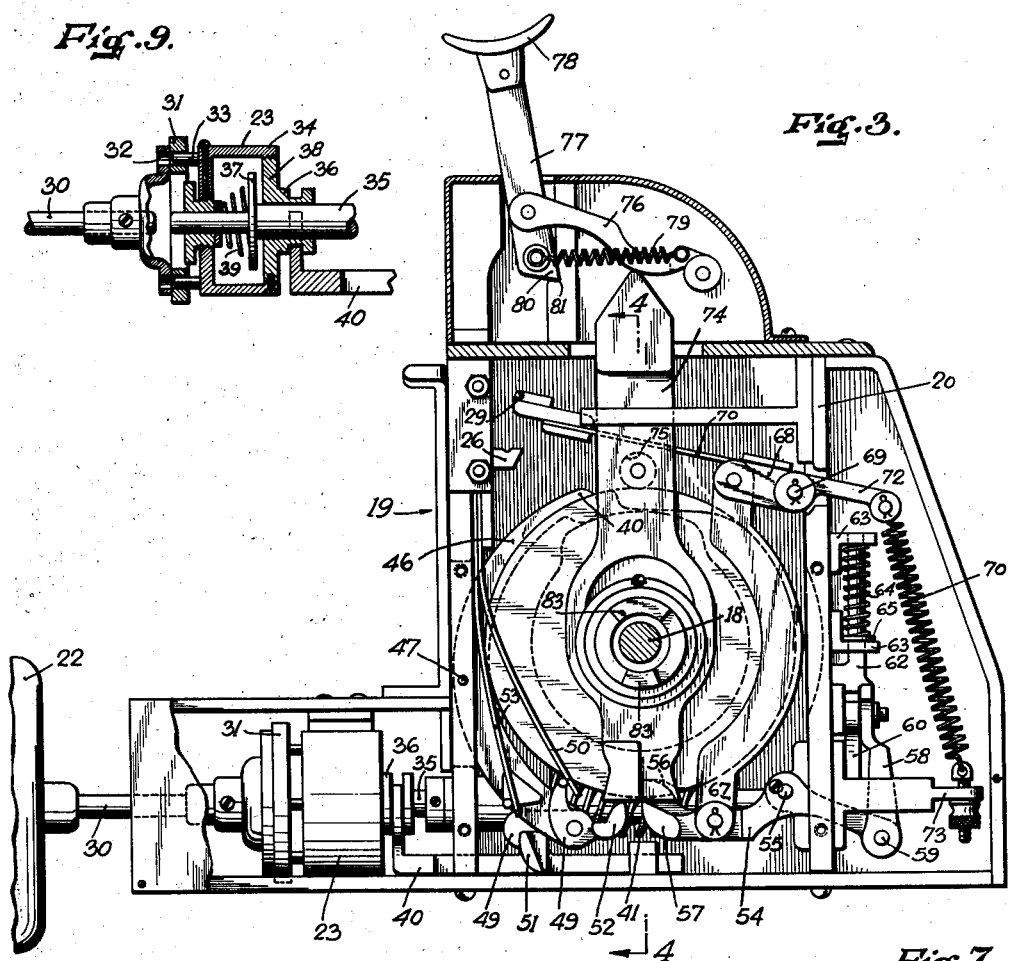
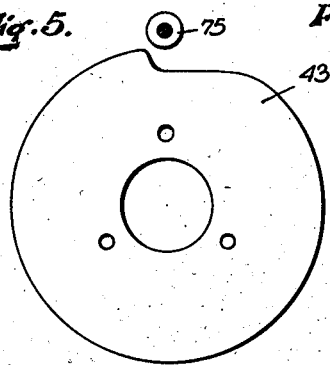
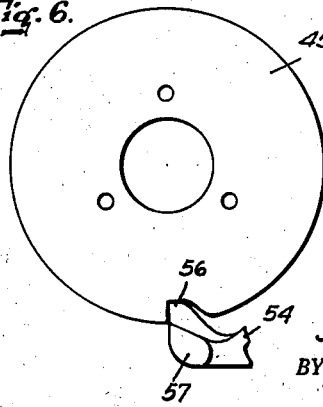
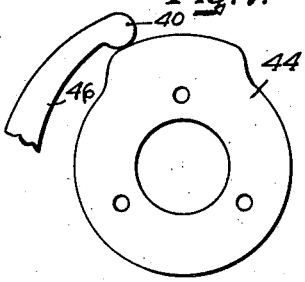
INVENTOR.
JAMES T. LISTER,
BY Duell, Dunn & Anderson
ATTORNEYS.

Patented Feb. 19, 1935

1,991,686

UNITED STATES PATENT OFFICE 1,991,686

POWER DRIVE FOR CYCLICAL RECORD MACHINES

James T. Lister, Niagara Falls, N. Y., assignor to American Sales Book Company, Limited, Toronto, Ontario, Canada, a corporation of Ontario, Canada Application February 6, 1932, Serial No. 591,269

21 Claims. (Cl. 192—149)

This invention relates to improvements in automatic driving connections for effecting automatic power drive of various forms of record machines, and with reference to some of the particular features thereof, it relates to improvements in power driving connections for effecting record feed in record machines such as, typewriters, billing machines, computing machines, autographic registers and the like.

It is a general object of the invention to provide an improved driving mechanism, more especially, for machines of the class mentioned which will effect power drive of the machine through a predetermined cycle of operation and then automatically discontinue such drive until again set in operative condition to initiate another operating cycle.

Another object of the invention is to provide an improved starting mechanism for starting the cycle of operation of the power driving mechanism, the design being to provide a starting mechanism which may be simply manually operated with little exertion and which is provided with an automatic lock to avoid accidental or unauthorized operation.

According to another important feature of the invention, an improved stop mechanism is provided, under automatic control of the driving mechanism and operated thereby to check the driven record feed or other mechanism in a predetermined position at the termination of a feeding cycle thereof. This improved stop is arranged to remain in checking condition after setting thereof until again set in releasing condition by an independent agency such as a manual setting mechanism.

Another object is to provide for an automatic drive of the class mentioned an improved shock absorbing mechanism for absorbing the inertia of the moving parts upon actuation of the stop mechanism to check the operation of the machine.

Still another object of the invention is to provide an improved power drive for machines of the class mentioned including a driving motor and a driving clutch together with improved manual means for setting the clutch in operative condition and starting the motor, and also improved automatic means for opening the power circuit to the motor and approximately at the same time releasing the driving clutch.

Other objects of the invention will be in part pointed out in the following detailed description of an illustrative but preferred embodiment of the invention and will in part be obvious in connection therewith.

The invention accordingly comprises the features of construction, combinations of elements, and arrangement of parts, which will be exemplified in the construction hereinafter set forth and the scope of the application of which will be indicated in the claims.

For a more complete understanding of the nature and objects of the invention reference is had to the following detailed description of the illustrative embodiment and to the accompanying drawings, in which:

Fig. 1 is a side elevation of a record machine of the autographic register type equipped with the invention;

Fig. 2 is an enlarged end elevation with parts removed for fullness of disclosure, and the record machine being shown in transverse vertical section substantially on the line 2—2 of Fig. 1 looking in the direction of the arrows;

Fig. 3 is an enlarged elevation of the driving mechanism shown in Fig. 1, the cover plate being removed and parts being broken away to reveal important features of the mechanism;

Fig. 4 is a sectional view taken approximately on the line 4—4, Fig. 3;

Figs. 5, 6 and 7 are fragmentary elevations partially diagrammatic of the controlling cam structure, the parts being positioned substantially the same as shown in Fig. 3;

Fig. 8 is a detailed view of the worm wheel clutch shown in Fig. 4, and

Fig. 9 is a central longitudinal section of the power drive clutch shown in elevation in Fig. 3.

Reference is now made to the drawings for a detailed description of the embodiment as shown. Since one of the important applications of the improved driving mechanism is for the operation of record machines, the invention is herein disclosed as combined with a record machine of the autographic register type. Furthermore, the invention is specially designed and adapted for the operation of record feeding mechanism of the cyclical type, wherein the record, usually including a plurality of relatively superposed record strips, is fed or advanced a definite distance such as the length of a form leaf, whereupon it is checked in position for the entry of a record upon the set of superposed record leaves which have thus been advanced into inscription receiving position.

Record machines of the class mentioned are known to those skilled in the art, and a well known form is disclosed for example in Patent No. 1,658,127, issued on February 7, 1928 to C. L. Johnston to which reference is made for a detailed disclosure. Briefly, as fully disclosed in this patent, this type of machine embodies a record feed shaft 10 rotatably mounted in a casing 11 which ordinarily provides a housing for the supply of record or record strips ordinarily of the long continuous traveller type. A pair of circular feed disks, one of which is shown at 12 is mounted upon the shaft 10 for rotation therewith. The peripheries of these disks are in engagement with the upper feed roll 13 thus forming feeding grips for receiving the records, so that rotation of the disks will effect forward feeding movement of the record. The upper feed roll 13 may be driven as shown by intermeshing driving gears 14.

Since this type of feeding mechanism is commonly used with record strips having feed controlling and aligning apertures arranged in two series therealong, one series for each feed disk 12, a starting mechanism is commonly employed for effecting a starting of the record feed after the strip apertures have come into alignment with the grip between the feed disks and the feed roll. As described in the prior patent above referred to, this starting device may be in the form of starting lugs 15 mounted upon the feed disks and having record engaging peripheral surfaces extending laterally from the feed disks. These starting lugs are thus designed to engage and grip the strips against the feed roll at points laterally beyond the feed controlling apertures.

For the improved power drive for the feed shaft 10 as herein disclosed, the exterior end of said shaft is provided with a tooth driving pinion 16 meshing with another tooth pinion 17 connected to the driving shaft 18 of the improved driving mechanism which is embodied in a unit as herein disclosed and indicated generally at 19. This driving unit includes a supporting frame or casing 20 which functions as a support and housing for operative elements.

As shown, the driving unit is preferably arranged so as to be applied as a unit in driving position upon the casing of the record machine and similarly removed. For this purpose, a supporting or base plate 21 is arranged to be detachably connected to the register casing 11, the operating elements being mounted upon and supported by this base plate. The driving unit includes an electric driving motor 22, a driving clutch 23, and reduction gearing and control mechanism indicated generally at 24.

As shown, the power supply connections for the motor are preferably mounted upon the driving unit casing 20. These include the outlet contacts 25, to which the power source may be connected, and conductors lead from these outlet contacts to the controlling contacts 26, being preferably housed by the protecting conduit 27. From the contacts 26 of the controlling switch, the supply conductors are carried by the flexible conduit 28, leading to the terminals of the motor. There are two circuit controlling contacts 26, as shown in Fig. 4, these being connected in series with one of the supply conductors. The movable contact 29 of the controlling switch is arranged to bridge the stationary contacts 26, when in closed position, so as to complete the power circuit to the motor. The motor circuit is broken when this switch is opened by moving the contact 29 away from engagement with the contacts 26.

Connected to the motor drive shaft 30 is the driving element of the driving clutch 23. This driving element is keyed or pinned to the drive shaft and includes a rotary disc 31, having apertures 32 for the reception of driving lugs 33, carried by the casing 34. Disc 31 is disclosed as comprising two elements, the outer of which is of metal and connected to the shaft, while the inner member is of fibre board and rigidly attached to the first. This casing forms the second driving part of the clutch 23 and is continuously connected for rotation with the driving disc 31 by means of the lugs 33. This housing, however, is mounted for longitudinal movement upon the main driving worm shaft 35 toward and away from the driving disc 31 by means of the grooved supporting hub 36.

Positioned within the clutch casing 34, and connected to the worm shaft 35 for rotation therewith, is the friction driving disc 37 positioned for contacting in frictional driving relation with the inner surface of the head 38 of the casing, which thus forms the second frictional driving element of the clutch. A compression spring 39 normally urges these friction elements into driving frictional contact with each other, while movement of the casing in the opposite, or clutch releasing direction, is effected by the operating fork 40.

The driving worm shaft 35 is rotatably mounted upon the unit casing 20, carrying a driving worm 41 engaging with a worm wheel 42, which is connected for driving the drive shaft 18 through a clutch mechanism later described. Rigidly secured to the worm wheel 42, for rotation therewith, by screws or other means, are three disc cams 43, 44 and 45.

The cam 44 is connected for automatic disengagement of the driving clutch 23. For this purpose, a lever, or rocker arm, 46, pivoted at 47 to the casing, has its follower end 48 engaging the peripheral surface of cam 44, while at its opposite or free end a latch or clutch operating dog 49 is pivoted for rocking movement. This latch has an arm engaged by a leaf spring 50, stressed to normally hold the dog in engaging position, while another arm has a latch formation for engagement with a lug 51, mounted upon the clutch operating fork 40. This lug has a forwardly inclined face for engagement with the end of the latch, whereby automatic engagement is effected when the latch is swung to the left, as viewed in Fig. 3. This latch 49 also has an operating lug 52 for manual release of the latch, as later described. The rocker arm 46 is normally yieldingly urged into latch engaging position by means of a spring 53.

The cam 45 controls the motor cutout switch 29 and also the automatic stop for the record machine. The mechanism for this purpose includes a lever, or rocker arm, 54 pivoted to the casing at 55, and having at one end a follower contact 56 positioned for engagement with the peripheral cam surface of cam 45. At this end of the lever 55, there is also a lug 57 for manual control, as later described. To the opposite end of the rocker arm 54, a link 58 is pivoted at 59, the opposite end of this link being pivoted to an arm of the stop dog 60. Another arm of this stop dog is pivoted at 61 to a plunger 62, mounted for sliding movement in brackets 63, carried by the casing. A compression spring 64 is confined between one of these brackets and a follower plate 65 secured to the plunger. This arrangement functions as a buffer for the automatic stop, as more fully described below.

A third arm of the stop dog 60 extends downwardly into position for contact with a stop lug 66 mounted upon the projecting end of the worm shaft 35 for rotation therewith. Therefore, when the dog 60 is swung into the position of Fig. 2, the rotary lug 66 will contact with the depending arm of the stop dog so as to arrest rotation of the worm shaft.

The position of the stop dog is controlled manually as later described and automatically by the cam 45 through the rocker arm 54 and connecting link 58.

It will be seen, upon reference to Fig. 3, that the motor controlling switch 29 is also controlled by the cam 45 through the rocker arm 54. For this purpose, a link 67 is pivoted to the rocker arm 54 and at its opposite end is pivoted to a switch arm 68 mounted for pivotal movement at 69. This switch arm has a resilient extension 70, preferably of spring metal, upon the end of which the switch contact 29 is mounted. Adjustable tension springs 70 are connected to the rearward extension 72 of the switch arm and at opposite ends to a bracket 73. These springs are normally tensioned to open the switch 29.

A manual setting device is also provided for setting the driving mechanism in condition for driving the record feed by the motor. This setting mechanism, as best shown in Figs. 3 and 4, includes an operating plunger 74 mounted in vertical position adjacent to the cam 43 and having a cam roller 75 positioned for engagement with said cam. The plunger 74 is mounted for vertical reciprocating movement and is provided at its lower end with a contact surface positioned for engagement with the operating lug 52 of the clutch latch 49 and also for engagement with the lug 57 of the rocker arm 54. The upper end of the operating plunger 74 is positioned for contact with a pivoted lever 76 having its free end pivoted to an operating bar 77 carrying the operating key or finger piece 78. A tension spring 79 is connected to the lower extension of the operating bar 77 which is formed to provide a locking bolt 80. The tension spring 79, therefore, normally rocks the operating bar 77 to bring the locking bolt 80 into engagement with a seat 81 formed in a bar mounted upon the frame. It will thus be seen that the operating bar 77 cannot be depressed until it is swung on its pivot in opposition to the spring 79. Unauthorized or accidental depression of the starting key is thus effectually avoided.

As best shown in Figs. 4 and 8, the worm wheel 42 is provided with a hub or sleeve extension 82 concentric with the drive shaft 18 and having clutch lugs 83 at the outer end thereof. Also concentric with the shaft 18 is a second sleeve 84 having at its outer end a knob 85 for manual operation thereof. This operating sleeve also has a clutch head provided with clutch lugs 86 positioned for engagement with the lugs 83. A compression spring 87 confined between a pin 88 on the shaft 18 and an internal seat 89 normally urges the operating sleeve 84 into position for engagement of the clutch lugs 83 and 86 with each other, thus setting the clutch. When the sleeve 84 is retracted against the compression spring 87 the clutch lugs disengage each other to release the clutch. The sleeve 84 may be held in retracted position by a pin 90 on shaft 18, normally seated in a slot 91 in the sleeve. When the sleeve is thus retracted, it is turned slightly in a counter-clockwise direction so as to bring the stop pin 90 into engagement with a seat 92 at the inner end of the sleeve. The seat 92 may be formed to limit this rotation of the sleeve 84 so that the shaft 18 may be rotated manually by means of the knob 85 independently of rotation of the worm and worm wheel. This arrangement provides for a convenient manual operation of the record feed. Also, it will be understood that the record feed shaft 10 may be provided with a crank for manual operation thereof, so that record feed can be independently effected when the clutch sleeve 84 is retracted. This provides for independent operation of the feed shaft without at the same time turning the worm wheel, which would of course, obstruct such feeding action.

From the foregoing detailed description of the illustrative embodiment of the invention, the operation will be readily understood by those skilled in the art and may be summarized as follows:

Assuming the driving mechanism to be in the operative position of Figs. 2 and 3 wherein the driving clutch 23 is released and the motor control switch 29 opened, an operative cycle may be initiated by depression of the starting key 78. In order that this key may be depressed, it must be swung laterally slightly as mentioned, in order to release the locking bar 80 from its seat 81.

Depression of the key causes downward movement of the starter plunger 74 rocking the clutch latch 49 and at the same time rocking the lever 54 upon its pivotal mounting.

This movement of the clutch dog 49 releases it from engagement with the lug 51 upon the clutch operating fork 40 whereupon the operating clutch 23 is engaged in driving position by the action of the compression spring 39. At approximately the same time the switch 29 will be closed by actuation of the lever 54 thus starting the motor. Also, depression of lever 54 swings the stop dog 60 from engagement with the stop lug 66 thus freeing the driving mechanism for operation. The record feed device is thus driven by the motor for a complete cycle of record feed as fully set forth in the Johnston patent above mentioned.

Upon completion of the record feeding cycle, or slightly therebefore, the driving clutch 23 is released by actuation of the cam 44 and the rocker arm 46, the clutch latch 49 having in the meantime become automatically again engaged with the lug 51. At approximately the same time, the switch 29 will be moved to open position by the springs 70, the cam 45 at this time being in position to permit swinging movement of the rocker arm 54.

This swinging movement of the rocker arm 54 also functions at this time to swing the stop dog 60 into position for engagement with the stop lug 66 on the worm wheel shaft thus stopping its rotation. This stop action is arranged to occur approximately at the moment of completion of the feeding cycle. At the moment of this stop action, the resilient buffer 64 functions to absorb the inertia of the moving parts thus avoiding shocks with consequent noise and strain upon the mechanism. The parts of the control and driving mechanism are now in the initial stage and ready for the starting of a new operating cycle.

As soon as the cycle of operation is started, it will be observed that the driving clutch 23 remains in driving condition and the switch 29 remains closed until approximately the end of the feeding cycle. During continuation of the cycle, the latch dog 49 is moved to its lug engaging position by spring 53 and the switch 29 is held closed by engagement of the follower 56 of lever 54 with the periphery of the cam 45. Also, the plunger 74 is held in its raised position by engagement of the roller 75 with the periphery of the cam 43. When in initial condition, the clutch 23 is maintained released by engagement of the rocker arm 46 with its cam while the switch remains open by virtue of the spring 70. The depressed surface of cam 45 at this time is opposite to the follower 56 thus permitting manual closure of the switch. Also, the depressed surface of cam 43 is opposite to the cam roller 75 thus permitting depression of the plunger 74.

By reference to Fig. 3, it will be noted that the driving motor 22 is directly connected to the worm shaft 35 through the driving clutch 23, and also that the stop device 60 cooperates directly with the worm shaft. The checking effort of the stop mechanism therefore is applied to the worm shaft rather than to the driving shaft 18 or to the record feed shaft 10. This checking is therefore applied to the parts having the greatest inertia due to their rapid rotation, and undue stresses upon the worm drive and other operative parts are avoided. Furthermore, it will be seen that due to the arrangement of the cams 44 and 45 the clutch 23 will be released from the driving motor 22 prior to setting the checking dog 60 in position for checking cooperation with the rotary stop lug 66. Therefore, at the time the checking function occurs the motor will have been disconnected and it may thus rotate freely after the worm shaft is checked. With this arrangement sudden checking of the driving motor is avoided and stresses upon the checking mechanism and other parts are minimized.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a driving mechanism, in combination, a driven element, driving connections for said element including a driving clutch, a driving motor connected to drive said clutch, a controlling switch for said motor, automatic means controlled by said driving connections for releasing said clutch and opening said controlling switch after a predetermined operative cycle of said driven element, and a stop device automatically controlled by said driving connections for checking said driven element in a predetermined position.

2. In a driving mechanism, in combination, a driven element, driving connections for said element including a driving clutch, a driving motor connected to drive said clutch, a controlling switch for said motor, automatic means controlled by said driving connections for releasing said clutch and opening said controlling switch after a predetermined operative cycle of said driven element, a stop device automatically controlled by said driving connections for checking said driven element in a predetermined position, and a yielding buffer connected to said stop device for absorbing the momentum of the moving parts.

3. In a driving mechanism, in combination, a driven element, driving connections for said element including a driving clutch, automatic means controlled by said driving connections for releasing said clutch after a predetermined operative cycle of said driven element, a stop device automatically controlled by said driving connections for checking said driven element in a predetermined position, and independently controlled means for setting said clutch in driving condition to initiate driving actuation of said driving connections.

4. In a driving mechanism, in combination, a driven element, driving connections for said element including a driving clutch, a driving motor connected to drive said clutch, a controlling switch for said motor, automatic means controlled by said driving connections for releasing said clutch and opening said controlling switch after a predetermined operative cycle of said driven element, a stop device automatically controlled by said driving connections for checking said driven element in a predetermined position, and independently controlled means for setting said clutch in driving condition to initiate driving actuation of said driving connections, and at the same time closing said switch.

5. In a driving mechanism, in combination, a driven element, driving connections for said element including a driving clutch, automatic means controlled by said driving connections for releasing said clutch after a predetermined operative cycle of said driven element, independently controlled means for setting said clutch in driving condition to initiate driving actuation of said driving connections, a manual controlling key for said last mentioned means, and an automatic lock for locking said key against operation.

6. In a driving mechanism, in combination, a driven element, driving connections for said element including a driving clutch, automatic means controlled by said driving connections for releasing said clutch after a predetermined operative cycle of said driven element, independently controlled means for setting said clutch in driving condition to initiate driving actuation of said driving connections, and a manual controlling key for said last mentioned means including a swingably mounted lever having a lock extension and biasing means for swinging said lever into locking position to prevent actuation of said key for setting said clutch in driving condition.

7. In a driving mechanism, in combination, a driven element, driving connections for said element including a driving clutch, a clutch operating cam driven by said driving connections, a rocker arm operatively connected to said cam, an engageable and disengageable clutch operating connection between said clutch and said rocker arm, and automatic means for engaging said clutch operating connection in condition for clutch operation by said cam.

8. In a driving mechanism, in combination, a driven element, driving connections for said element including a driving clutch, a clutch operating cam driven by said driving connections, a rocker arm operatively connected to said cam, an engageable and disengageable clutch operating connection between said clutch and said rocker arm, automatic means for engaging said clutch operating connection in condition for clutch operation by said cam, and independent manual means for disengaging said clutch operating connection.

9. In a driving mechanism, in combination, a driven element, driving connections for said element including a driving clutch, a clutch operating cam driven by said driving connections, a rocker arm operatively connected to said cam, an engageable and disengageable clutch operating connection between said clutch and said rocker arm including a latch pivoted to said rocker arm and a latch engaging lug, automatic means for engaging said latch with said lug for clutch operation by said cam, and independent manual means for releasing said latch from said lug to permit independent actuation of the clutch.

10. In a driving mechanism, in combination, a driven element, driving connections for said element including a driving clutch, a clutch operating cam driven by said driving connections, a rocker arm operatively connected to said cam, an engageable and disengageable clutch operating connection between said clutch and said rocker arm, automatic means for engaging said clutch operating connection in condition for clutch operation by said cam, and an automatic stop for said driven element controlled by said driving connections for checking the driven element upon release of said clutch by said cam.

11. In a device of the character described, in combination, a cyclical record feeding device, normally inoperative power driving connections for said feeding device, means for setting said driving connections in operative condition to effect power drive of said feeding device, means for continuing said driving connections in driving condition after setting thereof by said setting means, automatic means controlled by said driving connections for discontinuing the driving condition of the latter after a predetermined operative cycle of the feeding device, and an automatic stop device for checking operation of said feeding device upon completion of a feeding cycle thereof.

12. In a device of the character described, in combination, a cyclical record feeding device, normally inoperative power driving connections for said feeding device, means for setting said driving connections in operative condition to effect power drive of said feeding device, automatic means controlled by the driving connections for continuing said driving connections in driving condition for a predetermined interval after setting thereof by said setting means, a stop device embodied in said driving connections for checking operation of said feeding device upon completion of a feeding cycle thereof, and an automatic control for said stop device operatively connected to the driving connections.

13. In a device of the character described, in combination, a cyclical record feeding device, normally inoperative power driving connections for said feeding device, means for setting said driving connections in operative condition to effect power drive of said feeding device, automatic means controlled by the driving connections for continuing said driving connections in driving condition after setting thereof by said setting means and subsequently discontinuing said driving condition, a stop device embodied in said driving connections for checking operation of said feeding device upon completion of a feeding cycle thereof, an automatic control for said stop device operatively connected to the driving connections and set thereby into operative position, and means operatively connected to said setting means for releasing said stop device.

14. In a device of the character described, in combination, a cyclical record feeding device, power driving connections for said feeding device including a drive clutch and a worm with engaging worm wheel, a driving connection between said worm wheel and said feeding device, means for setting said driving connections in operative condition, including connections for setting said clutch in driving condition, means for continuing said driving connections in driving condition after setting thereof by said setting means, a stop device including a stop lug rotatable with said worm and also a movably mounted stop dog cooperative with said lug, driving connections driven by said worm wheel for moving said stop dog into position for engagement with said rotary stop lug to check rotation of said feeding device, means operatively connected to said worm wheel for releasing said clutch, and means controlled by said setting means for releasing said stop dog from checking position.

15. In a device of the character described, in combination, a record feeding device, power driving connections for said feeding device including a worm wheel and a driving worm therefor, a driving connection between said worm wheel said feeding device, a releasable driving clutch between said driving connection and worm wheel, permitting actuation of said feeding device independently of said worm wheel when the clutch is released, a handle for releasing said clutch, and connections between said handle and said driving connections for operation of the latter by said handle when said clutch is released.

16. In a device of the character described, in combination, a record feeding device, power driving connections for said feeding device including a worm wheel with a clutch extension and a driving worm therefor, a driving connection between said worm wheel and said feeding device, and a releasable driving clutch including a rotary connecting shaft concentric with said worm wheel, said worm wheel and connecting shaft being mounted for independent rotation, a clutch lug on said clutch extension, a spring pressed clutch element having a clutch lug cooperating with said first mentioned clutch lug, and means for rotating said connecting shaft and driving connection through said clutch element when said clutch is in released condition.

17. In a device of the character described, in combination, a cyclical record feeding device, power driving connections for said feeding device, a power driven worm shaft and a worm wheel connected to said feeding device, means for setting said driving connections in operative condition to effect power drive of said feeding device, automatic means controlled by said driving connections for discontinuing the driving condition of said driving connections after a predetermined cycle of the feeding device, a stop device cooperating directly with said worm shaft and automatically controlled by said driving connections for checking said feeding device in a predetermined position, and a yielding buffer connected to said stop device for absorbing momentum of the moving parts.

18. In a device of the character described, in combination, a record feeding device, power driving connections for said feeding device, a rotary connecting shaft and a worm wheel having a clutch sleeve thereon concentric with said connecting shaft, a driving worm meshing with said worm wheel, a driving connection between said connecting shaft and said feeding device, a spring pressed clutch sleeve concentric with said connecting shaft and in longitudinal alignment with said first mentioned clutch sleeve, clutch lugs between said sleeves providing a drive clutch, means for holding the clutch in released condition, and a connection between said clutch sleeve and said connecting shaft operative for rotating the latter through the sleeve independently of said worm wheel.

19. In a driving mechanism, in combination, a driven element, driving connections for said element including a power driving element, automatic means controlled by said driving connections for disconnecting the power element from the driving connections after a predetermined operation of the driven element, and a stop device automatically controlled to check said driven element subsequently to disconnection of said power element to stop said driven element in a predetermined position.

20. In a driving mechanism, in combination, a driven element, driving connections for said element including a power driving element, automatic means controlled by said driving connections for disconnecting the power element from the driving connections after a predetermined operation of the driven element, a stop device automatically controlled to check said driven element subsequently to disconnection of said power element to stop said driven element in a predetermined position, independent manual means for releasing said stop device and a yielding buffer connected to said stop device for absorbing momentum of the moving parts.

21. In a device of the character described, in combination, a cyclical record feeding device, power driving connections for said feeding device including a drive clutch and a worm with engaging worm wheel, a driving connection between said worm wheel and said feeding device, a power driving element connected to the worm through said drive clutch, automatically controlled means for releasing said clutch after a predetermined operation of the feeding mechanism, and a stop device directly connected to said worm and automatically controlled subsequently to clutch release to check said feed device in a predetermined position.

JAMES T. LISTER.